T. GREENWOOD.
WHEEL CUTTING MACHINE.
APPLICATION FILED FEB. 23, 1910.

1,008,031.

Patented Nov. 7, 1911.
3 SHEETS—SHEET 1.

T. GREENWOOD.
WHEEL CUTTING MACHINE.
APPLICATION FILED FEB. 23, 1910.
1,008,031.
Patented Nov. 7, 1911.
3 SHEETS—SHEET 3.
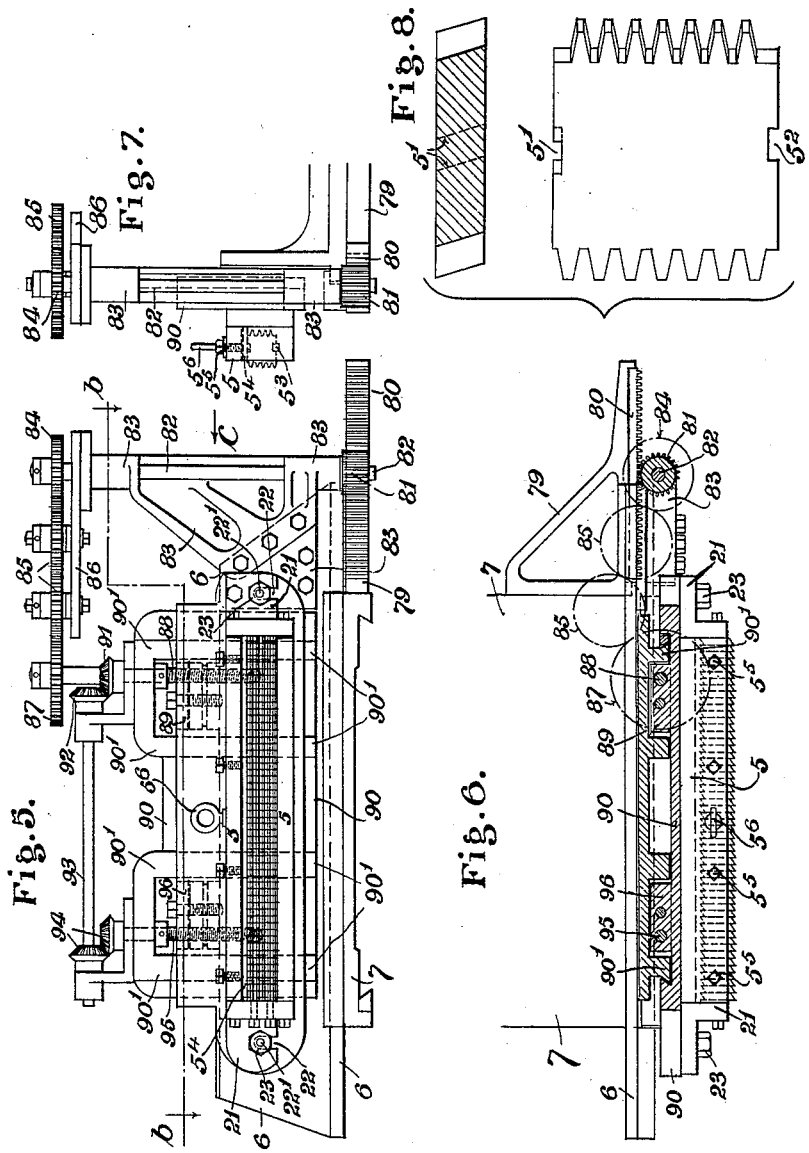

UNITED STATES PATENT OFFICE.

THOMAS GREENWOOD, OF HALIFAX, ENGLAND.

WHEEL-CUTTING MACHINE.

1,008,031. Specification of Letters Patent. Patented Nov. 7, 1911.

Application filed February 23, 1910. Serial No. 545,314.

*To all whom it may concern:*

Be it known that I, THOMAS GREENWOOD, a subject of the King of Great Britain, residing at Halifax, in the county of York, England, have invented new and useful Improvements in Wheel-Cutting Machines, of which the following is a specification.

My invention relates to wheel cutting machines of the type in which a cutter box containing one or more longitudinal rows of cutters is fed gradually toward the work during the cutting stroke, as described in the specification of my pending application for patent, Serial No. 383,848.

My invention consists of certain improvements in the cutting devices as hereinafter fully described and claimed.

For the purpose of my invention I employ a cutter box containing a suitable number, say five or more, of rows of similarly shaped cutters. Each row might be formed of single cutters, but I prefer to make the cutters in the form of plates in the manner and for the reasons hereinafter described. The cutter box, containing the rows of cutters, in addition to being reciprocated across the blanks, has according to my improvements a vertical reciprocating motion given to it at each stroke equal to the pitch being cut, and simultaneously with the movement of the cutters in a cutting direction, a circular pitch feed is given to the blanks, this feed taking place and being distributed over the entire length of the cutting stroke.

Figure 1:
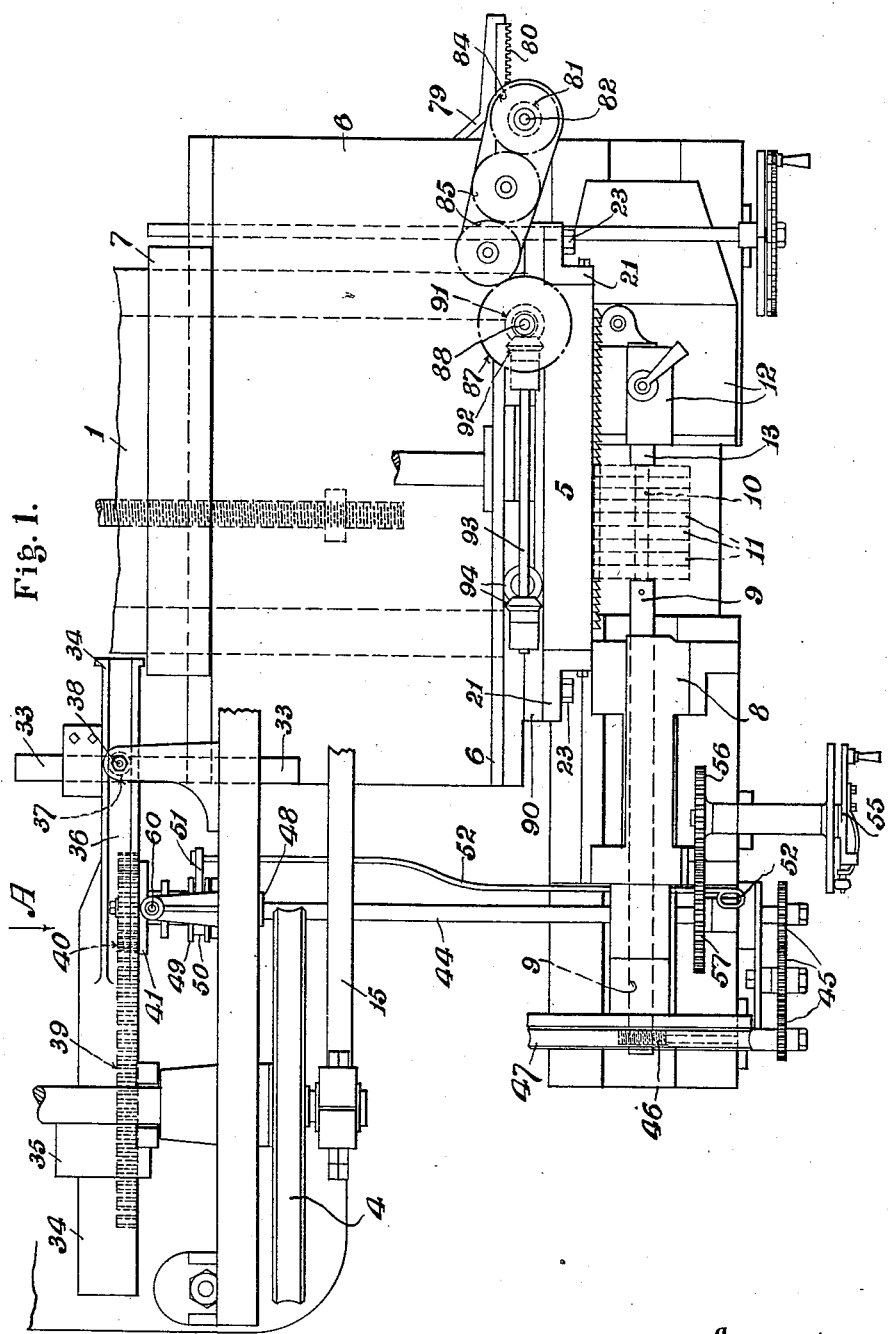
Figure 2:
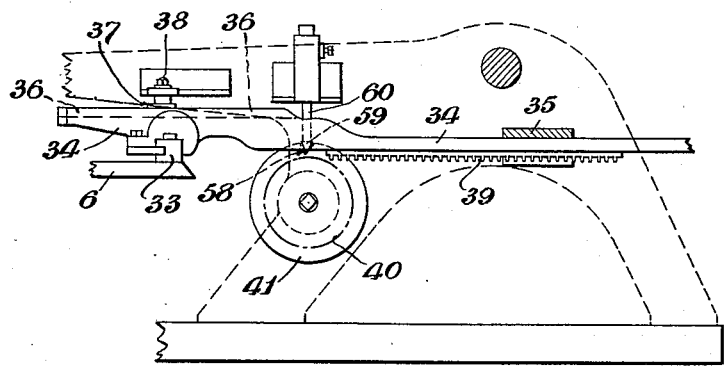
Figure 3:
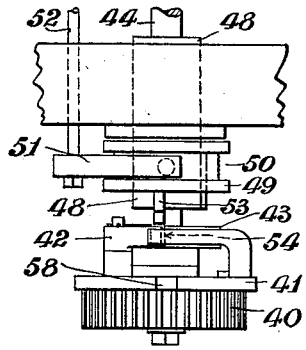
Figure 4:
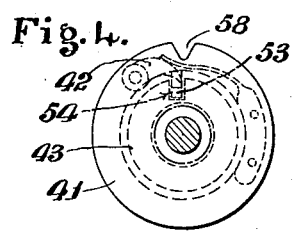

In the accompanying drawings: Figure 1 is a part plan view of a gear cutting machine of the type referred to, showing the improvements applied; Fig. 2 is a rear view of a portion of the mechanism looking in the direction of the arrow A, Fig. 1; Figs. 3 and 4 are respectively plan view and rear elevation on an enlarged scale of part of the circular pitch feed mechanism; Fig. 5 is a front elevation on an enlarged scale of a cutter box having my improved vertical reciprocating means applied; Fig. 6 is a sectional plan view of Fig. 5 taken as on the line *b—b* Fig. 5; Fig. 7 is an end view of Fig. 5, looking in the direction of the arrow C, Fig. 5; Fig. 8 illustrates in section and plan one of the cutter plates I employ.

Referring firstly to Fig. 1, the blanks to be cut are represented at 11, mounted on an arbor 10, which is fast at one end to the dividing spindle 9 journaled in the headstock 8, and is supported at the other end in the bush 13 carried by the tailstock 12. The cutter box 5 is carried by the slide 6 mounted in guide ways on the saddle 7 slidable on ways on the bed plate 1. Reciprocatory motion is imparted to the slide 6 by means of a connecting rod 15 eccentrically mounted on the face of the worm wheel 4 which is driven by a worm, not shown, from any convenient source of motion. These parts are all substantially as shown and described in the specification of my pending application previously referred to, and form no part of my present invention.

I will first describe the portion of the generating mechanism which effects the rotation or circular pitch feeding of the blanks. Fast to one rear end of the slide 6 is a cross slide or projection 33 on which works one end of a slide bar 34, the opposite end of which is supported in and works through a stationary slide bearing 35 suitably carried by the framework of the machine. On the upper side of this slide bar is a recessed guide groove 36 equalling or greater in length than the stroke of the slide 6. In this groove 36 works a pulley or runner 37 carried by a fixed stud 38 for the purpose of insuring that the slide bar 34 always moves in the same straight line. On the underside of the bar 34 is fixed a rack 39 adapted to gear with a rack wheel 40 having fixed thereto a round plate or flange 41 carrying a spring pawl or catch 42 adapted to drive a catch wheel 43 (Fig. 4) in one direction and during the cutting stroke of the cutter box slide. The rack 39 and wheel 40 are so proportioned that exactly one revolution is given to the catch wheel 43 during each cutting stroke. On the same shaft 44 as the catch wheel 43 is fixed one of the train of change wheels 45 by which motion is given to the worm 46 to drive the dividing worm wheel 47 fast on the dividing spindle 9. Mounted on the shaft 44 close to the catch wheel 43 is a long stationary boss 48, and on this boss slides a collar 49 having an annular groove 50 in its periphery in which engages the forked end 51 of a slide rod 52. The face of the collar 49 opposite the catch wheel has a projecting taper tongue 53 adapted, as the collar is slid toward the catch wheel, to enter the recess 54 in the said wheel and to engage the pawl or catch 42 and lift it out of gear with the catch wheel, thus putting the automatic feed out of action when required. This feed can also be done by hand by means of the hand dividing wheel 55 connected with the shaft 44 by gearing 56 and 57. The periphery of the flange 41 on the rack wheel 40 is provided with a V notch or recess 58 into which a V piece 59 (Fig. 2) is adapted to be pressed by a spring actuated rod 60 at the completion of each revolution to automatically insure that exactly a complete revolution of the catch plate and consequently the proper circular feed of the blanks takes place during each cutting stroke. Referring to the other portion of the generating motion, that is to say the cutters and the mechanism for vertically reciprocating the cutter box, Fig. 8 shows one of the cutter plates I employ, seven cutting edges being illustrated. One edge of each cutter plate is provided with a notch 5' at the same angle as the clearance behind the cutting edges. This enables the blank cutter pieces to be set and fixed so that a complete set of cutters can be milled or shaped together, whereby they all retain the correct shape when ground or sharpened. The opposite edge of the cutter plate is provided with a square or rectangular notch 5² to register on a tongue in the cutter box to facilitate securing of the said cutter plate in position. As shown at Fig. 8 the cutter plates are reversible, that is to say they are provided with cutting edges or cutters on both sides. This not only effects an economy in tool metal, but also prevents the cutting plates from being drawn out of true when being hardened. The cutter box 5 consists of an open fronted or recessed longitudinal casting, the bottom of the recess therein having a groove formed from end to end for the reception of a tongue 5³ on which the grooves 5² in the cutter plates register. The cutter plates are secured in position by means of a loose plate 5⁴ forced against their upper surfaces by screws 5⁵ passing through the top jaw of the cutter box. The casting forming the cutter box is provided with end lugs 21, 21, which are slotted as at 22, 22, said slots being adapted to register on bolts 22', 22', projecting from a plate 90 supported and movable vertically on guides 90', 90', fixed to the slide 6. Nuts 23, 23, serve to secure the cutter box to the plate 90, and on slackening these nuts the cutter box can be removed bodily, an eye bolt 5⁶ being provided for the purpose. Vertical movement is given to the plate 90 to cause the cutters to move upward or in the same direction as the rotary feed of the blanks during the cutting stroke a distance equal to the circular pitch feed given to the blanks by the means above described, and downward to their starting position during the idle stroke, as follows:

Fixed to an arm or bracket 79 attached to the front part of the saddle 7 is a stationary rack 80 gearing with a rack wheel 81 fast on a short shaft 82 journaled in a bracket 83 on the cutter box slide 6, the arrangement being such that one revolution is given to the rack wheel during each stroke. On the upper end of the shaft 82 is fast a change wheel 84 gearing through change wheels 85 carried by a swing plate 86, with a gear wheel 87 fast on the upper end of a vertical screw 88 passing through a projection 89 on the back of the plate 90 carrying the cutter box. A bevel wheel 91 fast on the screw 88 meshes, through bevel wheel 92, shaft 93, and bevel wheels 94 with a vertical screw 95 corresponding to the screw 88 and passing through a projection 96 on the plate 90. It will be understood that as the slide 6 is reciprocated in the usual manner the rotation of the rack wheel 81 will, through the intermediate connections, cause the screws 88 and 95 to be rotated thus giving an upward and downward reciprocating motion to the cutter box. The upward motion of the cutter box is equivalent to a pitch feed exactly coinciding with the circular pitch feed of the revolving blanks, and takes place during the cutting stroke. The two feed motions that is to say the circular pitch feed motion of the blanks and the tangential or vertical pitch feed motion of the cutter box are both arranged to operate during the cutting stroke and the circular feed motion only to be idle during the return stroke. It will be understood that the change wheels 85 are so arranged relatively to the pitch of the screws 88 and 95 as to cause the screws to move the cutter box the distance of the pitch being cut at every stroke. When once set to give this movement to the cutter box, they will serve for all wheels in which teeth are to be cut of the pitch for which the wheels are set. For the circular pitch feed of the blanks, however, the change wheels 45 will require altering for every variation in the number of teeth to be cut in a blank. The means for giving the circular pitch feed to the blanks could with slight modifications be employed as a dividing motion for ordinary wheel cutting. The above motions that is to say the circular pitch feed of the blanks and the tangential feed of the cutters combined with a cutter box containing a number of rows of cutters one behind the other form a generating motion by means of which I am enabled to generate accurately the exact shape of tooth for any pitch.

In combination with the generating mechanism herein described suitable means, such for instance as are described in the specification of my pending application previously referred to, are employed to feed the cutter box gradually toward the blanks during the cutting stroke to give the required depth of tooth, and away therefrom at the commencement of the return or idle stroke to move the cutters clear of the blanks and allow of the cutter box descending to its initial or starting position ready for a fresh cut. As such means form no part of my present invention, I have not deemed it necessary to show them herein.

The details of construction of my improvements may be varied without departing from my invention as will be understood by those skilled in the art.

Having thus described my invention, what I claim as new, and desire to secure by Letters Patent is:—

1. The combination, with a rectangular box open on one side and having a longitudinal guide rib on its bottom, of a series of cutters formed of flat pipes arranged in a packet inside the box and having guide slots in their bottom edges which engage with the said guide rib, a clamping plate arranged in the said box over the top edges of the cutters, and means for pressing the said plate against the cutters to secure them in position.

2. The combination, with a box which is open on one side, of a series of cutters formed of flat plates arranged in a packet inside the box, one side of the box and the adjacent edges of the said plates being provided with guide surfaces which engage with each other and prevent the plates from sliding crosswise of the box, a clamping plate arranged in the box at the other side thereof from the guide surfaces, and means for pressing the said plate against the cutters to secure them in position.

In witness whereof I have hereunto set my hand in presence of two witnesses.

THOMAS GREENWOOD.

Witnesses:
  FRANK LEWIN,
  WILLIE ARMITAGE HEYWOOD.

---

Copies of this patent may be obtained for five cents each, by addressing the "Commissioner of Patents, Washington, D. C."